United States Patent
Mizuno et al.

(10) Patent No.: US 6,481,880 B2
(45) Date of Patent: Nov. 19, 2002

(54) AIMING APPARATUS AND PROCESS FOR MANUFACTURING HEADLIGHT USING THE SAME

(75) Inventors: Hiromichi Mizuno, Aichi (JP); Hisashi Ito, Aichi (JP); Yoichi Tatsumi, Tochigi (JP)

(73) Assignee: Aoyama Seisakusho Co., Ltd., Nagoya (JP)

(*) Notice: Subject to any disclaimer, the term of this patent is extended or adjusted under 35 U.S.C. 154(b) by 0 days.

(21) Appl. No.: 09/911,672

(22) Filed: Jul. 24, 2001

(65) Prior Publication Data
US 2002/0015311 A1 Feb. 7, 2002

(30) Foreign Application Priority Data
Jul. 28, 2000 (JP) .......................................... 2000-28933

(51) Int. Cl.$^7$ ................................................. F21V 7/00
(52) U.S. Cl. ...................... 362/514; 362/523; 362/273; 362/277; 362/289; 362/319; 362/428
(58) Field of Search .................................. 362/512, 514, 362/523, 273, 277, 285, 289, 319, 418, 427, 428

(56) References Cited
FOREIGN PATENT DOCUMENTS
JP          05-008685          1/1993

*Primary Examiner*—Laura K. Tso
*Assistant Examiner*—Ronald E. DelGizzi
(74) *Attorney, Agent, or Firm*—Frishauf, Holtz, Goodman & Chick, P.C.

(57) ABSTRACT

The present invention relates to a aiming apparatus to be interposed between a reflector and a housing to adjust direction of light reflected by the reflector; the aiming apparatus comprising an adjusting screw rotatably engaged at one end with the housing at a predetermined position; a pivot nut having at one end a nut portion capable of achieving thread engagement with the other end of the adjusting screw and at the other end a pivot portion, respectively; a pivot holder attached to a rear side of the reflector; and a nut receiver fixed on the front side of the housing at a predetermined position.

7 Claims, 5 Drawing Sheets

AIMING APPARATUS AND PROCESS FOR MANUFACTURING HEADLIGHT USING THE SAME

BACKGROUND OF THE INVENTION

The present invention relates to a vehicular headlight, particularly to a aiming apparatus to be incorporated for adjusting orientation of a reflector of the headlight so as to optimize the direction of illumination when the headlight is attached to a vehicular body and also to a process for manufacturing a headlight using the same.

An exemplary constitution of a aiming apparatus 80 in a prior headlight 90 is shown in FIGS. 7 and 8. A reflector 91 is provided with a ball joint 81 at a lower right corner thereof with respect to the direction of fitting the reflector to a housing 92 and also with adjusting nuts 82 at an upper right corner directly above the ball joint and at a lower left corner (not shown) in alignment horizontally with the ball joint, respectively, in the state where the reflector 91 is attached to the housing 92.

Meanwhile, the housing 92 is provided with a ball receiver 81*a* at a lower right corner thereof to oppose the ball joint 81 and also with a pair of adjusting screws 82*a* to oppose the adjusting nuts 82 respectively. One adjusting screw 82*a* located at the upper right cornet is for adjusting vertically the orientation of the reflector; whereas the other adjusting screw 82*a* (not shown) located at the lower left corner is for adjusting horizontally the orientation of the reflector.

The headlight 90 having the constitution as described above is assembled by fitting first the ball joint 81 in the ball joint receiver 81*a* and then threading the adjusting screws 82*a* into the opposing adjusting nuts 82 respectively to achieve fitting of the reflector 91 to the housing 92, followed finally by fitting of a lens 93 to the housing 92.

It should be noted here that in FIG. 8, which is directed to minute illustration of the relationship between the adjusting nuts 82 and the adjusting screws 82*a*, the adjusting nuts 82 are fixed to substantially C-shaped nut holders 82*b* formed on the rear side of the reflector 91, respectively; whereas the adjusting screws 82*a* are each rotatably engaged at around the proximal end with the housing 92. If each adjusting screw 82*a* is, turned from the rear side of the housing, the opposing adjusting nut 82 is caused to move forward or backward along the adjusting screw 82*a* to enable changing of the orientation of the reflector 91 vertically or horizontally on the ball joint 81 serving as a pivot.

However, the prior aiming apparatus 80 involves a problem that the procedures of fitting the reflector 91 to the housing 92 is difficult, intricate and time-consuming, since engagement of the adjusting screws 82*a* with the adjusting nuts 82 are achieved respectively within the housing 92 under the condition where it is difficult to visually confirm them, and each adjusting screw 82 must be driven into the opposing adjusting nut 82 until the nut reaches an appropriate position of the opposing adjusting screw 82*a*.

There is another problem that the number of steps is increased. The reason is that it is difficult to align each adjusting screw 82*a* with the opposing adjusting nut 82 between them since the alignment is achieved respectively within the housing 92. As a result, there occurs a wide variation in the orientation of the reflectors 91 with respect to the housings respectively, and this inevitably requires readjustment of the reflectors 91 with respect to the direction of illumination, after the headlight 90 is assembled completely.

SUMMARY OF THE INVENTION

The present invention provides means, which can solve the problems inherent in the prior aiming apparatus. More specifically, the present invention provides a aiming apparatus to be interposed between a reflector and a housing to adjust direction of light reflected by the reflector; the aiming apparatus comprising an adjusting screw rotatably engaged at one end (proximal end) with the housing at a predetermined position; a pivot nut having at one end (proximal end) a nut portion capable of achieving thread engagement with the other end (distal end) of. the adjusting screw and at the other end (distal end) a pivot portion, respectively; a pivot holder attached to a rear side of the reflector; said pivot holder being capable of pivotally holding the pivot portion; and a nut receiver fixed on the front side of the housing at a predetermined position; said nut receiver being capable of receiving slidably a guard-like sliding guide formed at a top of the pivot nut; wherein a longitudinal axial line of the nut receiver is parallel to an axial line X of the adjusting screw engaged with the nut portion; and the pivot nut has a height equal to the vertical distance between a position where the nut receiver is engaged with the housing and a position where one end (proximal end) of the adjusting screw is engaged with the housing.

It should be noted here that the expression "a height equal to the vertical distance . . . " means that, one end (proximal end) of the adjusting screw engaged with the nut portion is located at a predetermined engaging position of the housing, in the state where the sliding guides are received in the nut receiver such that the longitudinal axial line of the nut receiver and the axial line of the adjusting screw engaged with the nut portion are parallel to each other.

BRIEF DESCRIPTION OF THE DRAWINGS

The invention together with the objects and advantages thereof, may best be understood by reference to the following description of the presently preferred embodiments together with the accompanying drawings in which.

DESCRIPTION OF THE PREFERRED EMBODIMENTS

The present invention will be described specifically referring to the attached drawings illustrating an embodiment.

Figure 1:
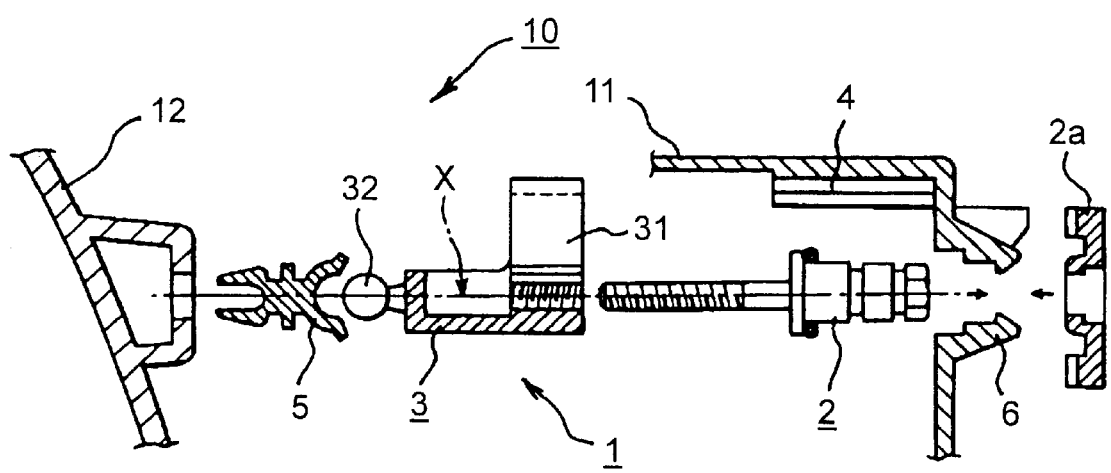
FIG. 1 is a partly cross-sectional and partly exploded view of the aiming apparatus according to an embodiment of the present invention.

The reference numeral 1 in FIG. 1 shows the aiming apparatus of the present invention. The aiming apparatus 1 is composed essentially of an adjusting screw 2, a pivot nut 3, a nut receiver 4, a pivot holder 5 and an adjusting screw receiver 6.

The adjusting screw 2 is adapted to be rotatably engaged at one end (proximal end) with the adjusting screw receiver 6 attached to a housing 11 of a headlight 10. A gear 2a is fitted to the proximal end of the adjusting screw 2 that is exposed to the rear external side of the housing to enable the operation of aiming the headlight 10 on that side thereof.

Meanwhile, the other end (distal end) of the adjusting screw 2 is engaged with the pivot nut 3 through its nut portion 31 located on the proximal side, which is engaged, through a pair of sliding guides 31b, with a nut receiver 4 attached to the housing 11. Thus, the pivot nut can be moved in the direction of the axis X by turning the adjusting screw through the gear 2a. Here, the adjusting screw can be advanced or retracted freely by selecting the direction of turning it.

The pivot nut 3 has a pivot portion 32 on the other side (distal side) that is opposite to the nut portion 31. The pivot portion 32 has a shape of ball joint formed coaxial with the adjusting screw 2 (so illustrated, but not necessarily be coaxial for the function of the pivot portion). The pivot portion 32 is fitted into the pivot holder 5 located on the rear side of a reflector 12. It should be noted here that the reflector is additionally provided on the rear side thereof with a mechanism (a ball joint mechanism, not shown) that is substantially composed of a pivot portion 32 and a pivot holder 5 and does not have the mechanism of moving the pivot portion with an adjusting screw. Therefore, the aiming apparatus 1 can turn the reflector 12 on the ball joint serving as a pivot. Here, in order to enable adjustment of the orientation of the reflector 12 only in one direction (vertically or horizontally), one aiming apparatus according to the present invention may be incorporated in addition to the ball joint mechanism at a suitable position on the rear side of the reflector; whereas two aiming apparatuses may be arranged likewise so as to enable adjustment of the reflector 12 in two directions (vertically and horizontally).

Figure 2:
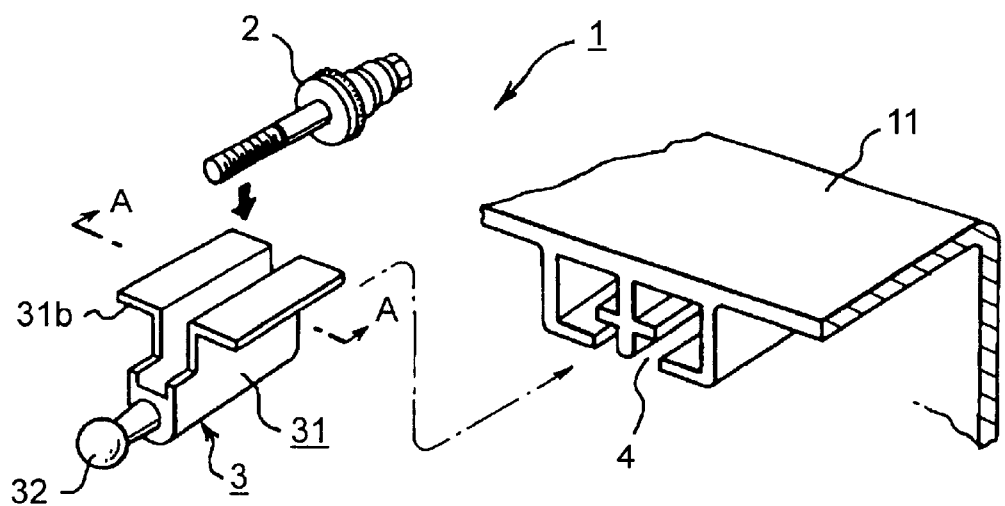
FIG. 2 is an exploded perspective view showing a mode of setting the adjusting screw into the pivot nut, which are major elements of the aiming apparatus of the present invention, and also a mode of fitting the pivot nut into the housing.
Figure 3:
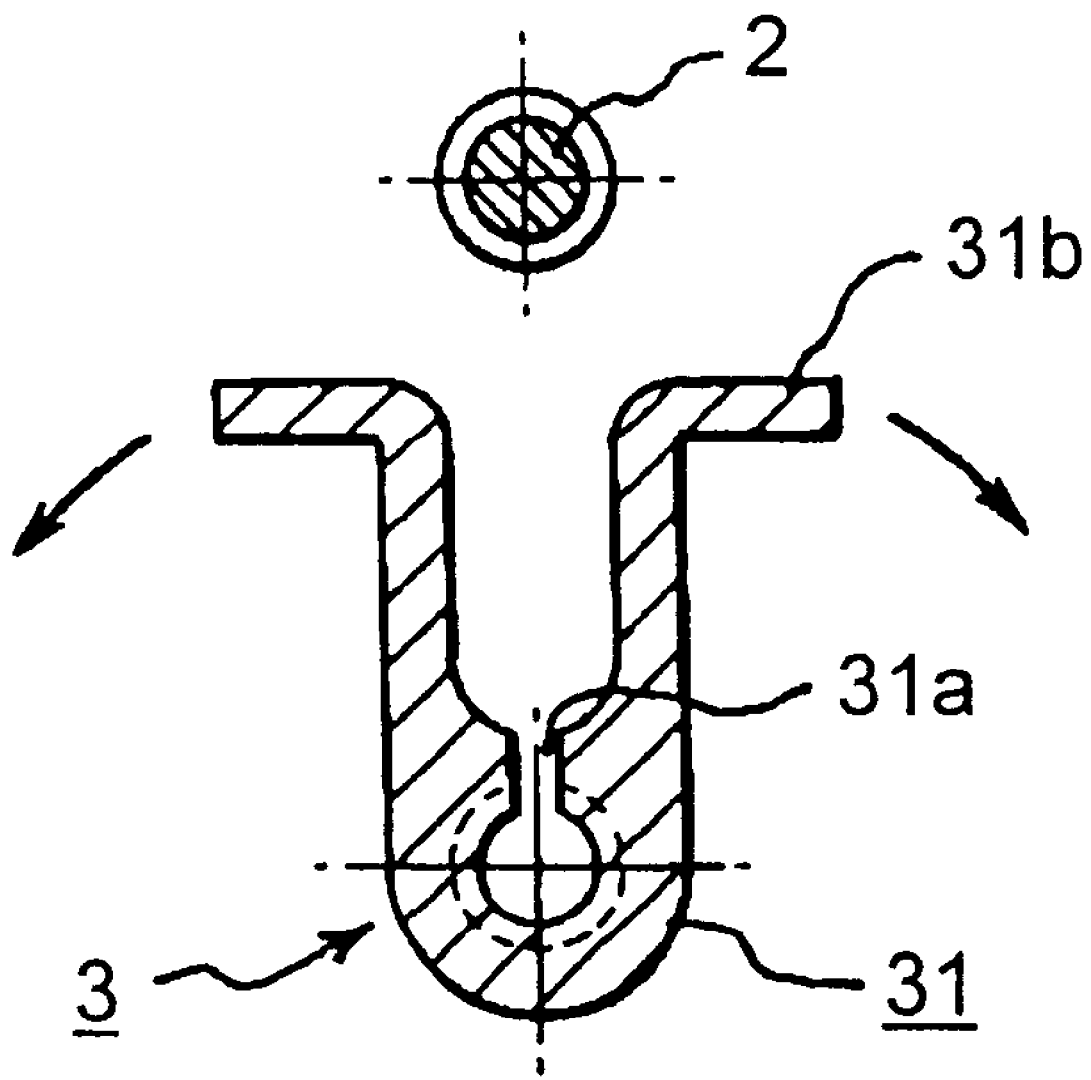
FIG. 3 is a cross-sectional view taken along the line A—A in FIG. 2.

FIGS. 2 and 3 show a favorable embodiment of assembling major parts of the aiming apparatus 1 including the adjusting screw 2, pivot nut 3 and the nut receiver 4 into a unit. In this embodiment, the adjusting screw is not threaded into the pivot nut in the ordinary way, but engagement between them is designed to be achieved by press-fitting the screw into the nut or clamping it with the nut. However, the engagement may of course be achieved by threading the screw into the nut in the ordinary way. More specifically, as shown also in FIG. 3, the pivot nut 3 has a slit 31a formed at an upper part of the nut portion 31 along the axis of the internal thread thereof. Further, a cavity is defined above the slit such that it can receive the adjusting screw substantially horizontally along the axis of the internal thread of the nut portion. Thus, the slit can be distorted to widen the clearance thereof by applying an external stress (the arrows in the drawings show the directions of stress to be loaded) to upper portions of the pivot nut, so that the adjusting screw can be brought into engagement with the internal thread by passing it from the cavity and through the slit. It should be noted here that the engagement between the adjusting screw and the nut portion may be achieved by pressing the adjusting screw itself downward against the slit to distort the slit by the stress of pressing.

The nut portion 31 also has at the top a pair of guard-like sliding guides 31b such that guard-like portions extend therefrom orthogonally outward respectively. Once the sliding guides 31b are fitted in the nut receiver 4, the nut portion is prevented from distorting in the direction of widening the slit 31a, so that there occurs no disengagement of the adjusting screw 2 from the nut portion 31. Here, the adjusting screw and the nut portion thus engaged with each other assume thread engagement.

Here, the nut receiver 4, which is to be fixed to the housing 11 at a predetermined position, has the sliding guides 31b of the pivot nut 3 fitted slidably therein parallel to the axis X, whereas the adjusting screw 2 is brought into thread engagement with the nut portion 31. Therefore, turning of the adjusting screw moves the pivot nut parallel to the axis X being guided by the nut receiver.

As described above, since the main function of the sliding guides 31b is to ensure moving of the pivot nut 3 in the direction of the axis X and engagement of the pivot nut with the housing 11, the slit 31a need not be formed at the upper part of the nut portion if the adjusting screw 2 is threaded into the nut portion 31 of the pivot nut by the ordinary way (in this case, the nut portion may be of an embodiment that it merely has an internal thread at the bottom, a pivot portion 32 at the distal end and sliding guides at the top.

Figure 4:
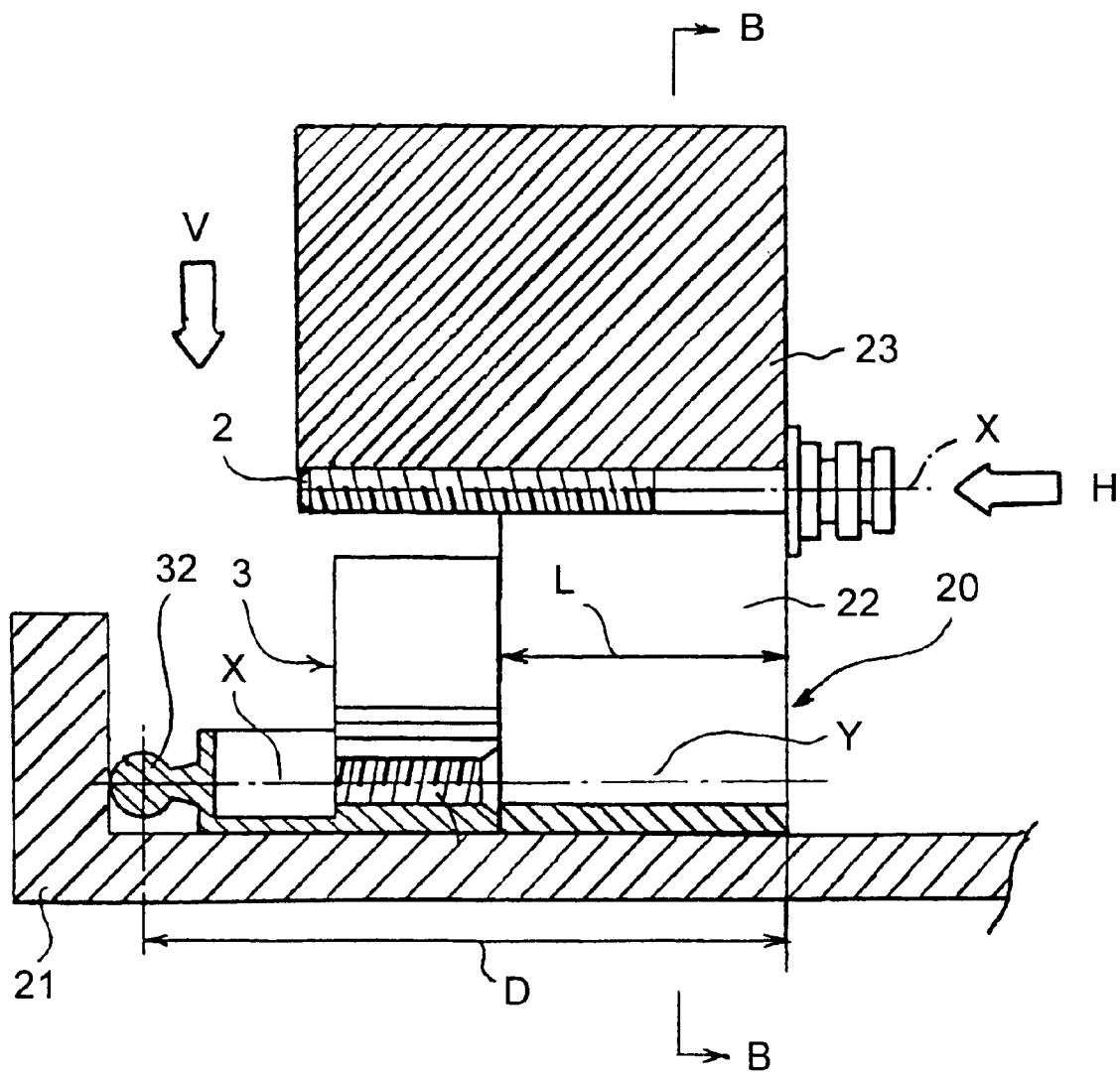
FIG. 4 is a partly sectional view for explaining procedures of setting the adjusting screw into the pivot nut in the process for manufacturing a aiming apparatus of the present invention.

FIG. 4 shows an example of the step of setting an adjusting screw 2 into a pivot nut 3 in a process of manufacturing a headlight using the aiming apparatus 1 according to the present invention. When engagement between the adjusting screw 2 and the pivot nut 3 is carried out in one step by widening the slit 31, as described above, a fitting device 20 is used to define relative location of the adjusting screw 2 and the pivot nut 3, for example, to secure the dimension D therebetween, as illustrated, so as to accurately attain the dimensional relation constantly.

Now, the dimension D will be described.

As already described in the prior art example, in the process of assembling a headlight 10, the final step of aiming the reflector should have been carried out after incorporation of the reflector 12 into the housing 11. The reason is that while it is essential to engage the adjusting screw 2 with the pivot nut 3 so as to secure a predetermined value in the relative location of them, it has been difficult to set up an accurate relative location between them within the housing in a condition where they are not visible.

On the contrary, if the relative location of the adjusting screw 2 and the pivot nut 3 can be preset accurately when the former is set into the latter, the final aiming step after the headlight is assembled completely can be omitted.

In the present invention, setting of the adjusting screw 2 into the pivot nut 3 can be achieved by employing the fitting device 20 capable of defining the dimension D. The fitting device 20 contains a base 21; a jig-A 22 to be placed on the base, which is abutted at the distal end face and at the proximal end face against the proximal end face (opposite to the pivot portion 32) of the pivot nut and against the lower flange surface of the head of the adjusting screw, respectively, and which also has a guide slit 22a (see FIG. 5) that can receive the adjusting screw slidably and horizontally; and a jig-B 23 for setting the adjusting screw into the pivot nut. More specifically, engagement of the pivot nut with the adjusting screw can be achieved by interposing the jig-A between them and securing a predetermined value L in the relative location of these two members with respect to the axis X.

Procedures of engaging the adjusting screw with the pivot nut are carried out, for example, as follows:

First, a pivot nut 3 is set on the base 21 such that its pivot portion 32 is abutted against one wall of the base.

Next, the jig-A 22 is set on the base such that the distal end face thereof is abutted against the proximal end face of the pivot nut. Here, the jig-A is set such that the longitudinal axial line Y of the guide slit 22a in the jig-A is aligned with the axial line X of the pivot nut (see FIG. 4).

Figure 5:
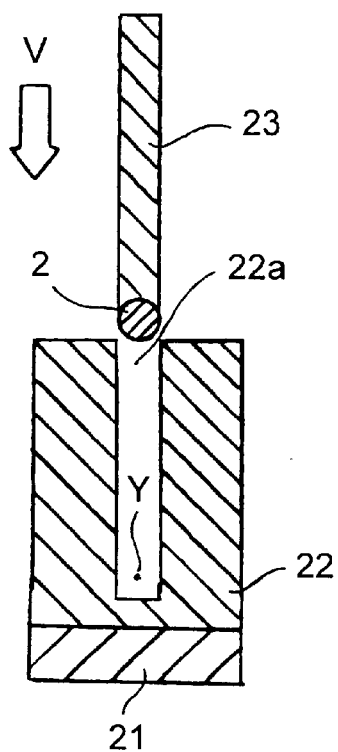
FIG. 5 is a cross-sectional view taken along the line B—B in FIG. 4.

Then, an adjusting screw is set in the guide slit of the jig-A such that the axial line X of the former is parallel to the axial line Y of the latter and that:the lower flange surface of the head of the adjusting screw is abutted against the other end (proximal end) face of the jig-A (see FIG. 5). Here, a force is applied to the head of the adjusting screw in the direction H by resilient means such as a compression spring attached to the other wall (not shown) of the base. Thus, since the force is transmitted through the jig-A to the pivot nut, the pivot nut is controlled not to move back and forth, right and left on the base. In the drawings, forward and backward movements and rightward and leftward movements are appreciated to be in the direction of the axial line X and in the direction orthogonal to the axial line X and parallel to the upper surface of the base, respectively. Here, while control of the rightward and leftward movements is substantially achieved by the control of the forward and backward movements, it is positively carried out by forming a dent capable of receiving the pivot portion of the pivot nut in one wall of the base and fitting the pivot portion therein.

Subsequently, the upper side of the adjusting screw is thrust with the jig-B 23 in the direction V. The jig-B has a curved bottom surface that can be abutted against the upper side of the adjusting screw and also has a thickness allowing insertion of itself slidably through the guide slit as shown in FIG. 5. Thus, the adjusting screw is thrust into the slit 31a of the pivot nut under guiding by the guide slit of the jig-A and is slid further in the direction V expanding the slit to be engaged, finally with the nut portion 31 of the pivot nut.

As described above, since the procedures of engaging the adjusting screw 2 with the pivot nut 3 is achieved under abutment of them against the end faces of the jig-A 22, respectively, the predetermined dimension D is secured in the relative location of the adjusting screw and the pivot nut during the above procedures. On the contrary, the length L of the jig-A can secure the dimension D. Therefore, it is of course possible to modify the order of the procedures of engaging the adjusting screw with the pivot nut and the contents of the procedures, so long as they are engaged with each other under abutment against the jig-A.

It should be noted here that the adjusting screw 2 and the pivot nut 3 are parts that can be utilized in common irrespective of the type of the headlight 10. However, it is essential to define the length of the adjusting screw and the range of forming threads thereof, the length of the nut portion of the pivot nut and the range of forming threads thereof, in other words, to define the range of the thread engagement between the threads of these two members within a presumable one. Therefore, if there are provided a set of fitting devices 20 having various optimum dimensions D, more exactly jigs-A 22 having various optimum dimensions L, depending on the type of headlight 10, the final aiming steps can be omitted from the processes of assembling various types of headlights 10, thus improving productivity.

Figure 6:
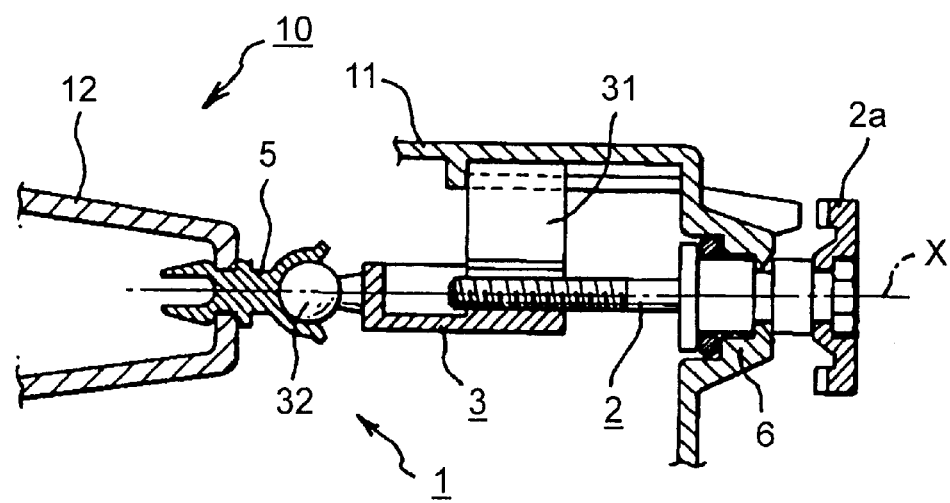
FIG. 6 is a partly cross-sectional view showing the aiming apparatus of the present invention incorporated into a headlight.
Figure 7:
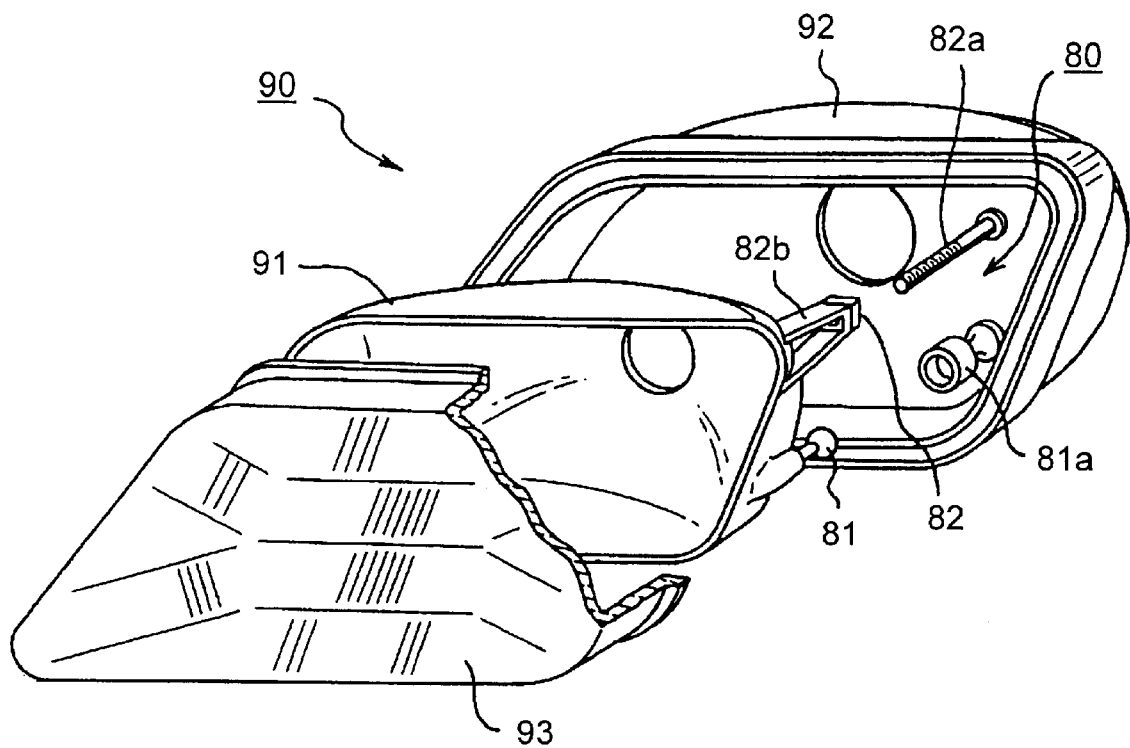
FIG. 7 is a partially cutaway perspective view showing the constitution of the prior headlight.
Figure 8:
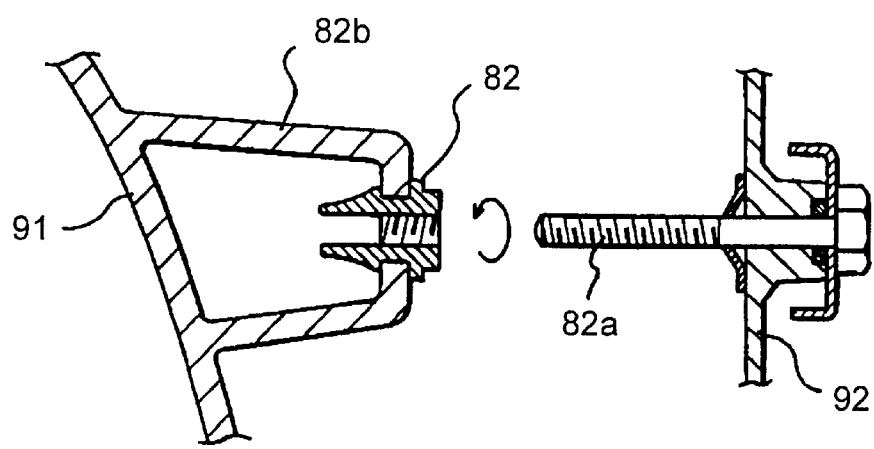
FIG. 8 is a partly cross-sectional view of the pertinent section in the constitution of the prior art.

Further, according to the aiming apparatus 1 of the present invention, the nut receiver 4 and the adjusting screw 2 to be set into the pivot holder 5 are adapted to be engaged with each other securing a constant axial distance therebetween, more exactly through fitting of the sliding guides 31b of the pivot nut into the nut receiver. Besides, the adjusting screw receiver 6 of the housing 11 is provided at a position where it can receive accurately the proximal end of the adjusting screw 2 engaged with the pivot holder such that the axial line of the nut receiver and the axis X of the adjusting screw are parallel to each other. Therefore, for example, if the pivot nut 3 engaged with the adjusting screw 2 is fitted in the nut receiver 4, and if the reflector 12 is pushed toward the front opening of the housing 11 after alignment of the pivot holder 5 with the pivot portion 32 of the pivot nut 3, the pivot holder 5, the pivot nut 3, the adjusting screw 2 and the adjusting screw receiver 6 are inevitably engaged with one another in position, dispensing with such operations of engaging them within the housing, in a condition where they are not visible, as have been required in the prior art. FIG. 6 shows a completed set of aiming apparatus 1 incorporated into a headlight having undergone the procedures as described above.

As described above, the aiming apparatus of the resent invention enables presetting of an adjusting screw in a pivot nut to a predetermined dimension using jigs and omission of the final aiming step after a headlight is assembled completely, exhibiting excellent effect in improving productivity of headlight.

The aiming apparatus of the present invention also eliminates, from the process of assembling a headlight, the very difficult and troublesome step of engaging an adjusting screw with a pivot nut within a housing in a condition where they are not visible, and in this;regard the apparatus again exhibits excellent effect in improving productivity of headlight.

It should be apparent to those skilled in the art that the present invention may be embodied in many other specific forms without departing from the spirit or scope of the invention.

What is claimed is:

1. A aiming apparatus (1) to be interposed between a reflector (12) and a housing (11) to adjust direction of light reflected by the reflector; the aiming apparatus comprising:

an adjusting screw (2) rotatably engaged at one end with the housing at a predetermined position;

a pivot nut (3) having at one end a nut portion (31) capable of achieving thread engagement with the other end of the adjusting screw and at the other end a pivot portion (32), respectively;

a pivot holder (5) attached to a rear side of the reflector; said pivot holder being capable of pivotally holding the pivot portion; and a nut receiver (4). fixed on the front side of the housing at a predetermined position; said nut receiver being capable of receiving slidably a guard-like sliding guide (31b) formed at a top of the pivot nut;

wherein a longitudinal axial line of the nut receiver is parallel to an axial line X of the adjusting screw engaged with the nut portion; and the pivot nut has a height equal to the vertical distance between a position where the nut receiver is engaged with the housing and a position where one end of the adjusting screw is engaged with the housing.

2. The aiming apparatus according to claim 1, further comprising a through hole (6) defined in the housing at the position where one end of the adjusting screw is engaged therewith, said hole receiving one end of the adjusting screw therethrough, and a gear (2a) fitted to that end of the adjusting screw to turn it.

3. The aiming apparatus according to claim 1, wherein the nut portion (31) of the pivot nut has at an upper part a cavity defined in an axial direction thereof, which can receive the adjusting screw substantially parallel to its axial line, and a slit (31*a*) communicating with the cavity and with the nut portion.

4. A process for manufacturing a aiming apparatus (1) to be interposed between a reflector (12) and a housing (11) to adjust direction of light reflected by the reflector; the process comprising:

engaging an adjusting screw (2) with a pivot nut (3) using a fitting device (20) that controls relative location thereof;

wherein said fitting device having a right dimension D is selected from those with various dimensions respectively depending on the type of the headlight in which the aiming apparatus is employed.

5. The process according to claim 4, wherein the fitting device (20) comprises a substantially horizontal base (21) having a pair of vertical walls on both sides thereof respectively, one of which can be abutted against a pivot portion (32) of the pivot nut (3); a jig-A (22) to be placed on the base, said jig-A being abutted at one end face and at the other end face against one end face of the pivot nut and against a lower flange surface of a head of the adjusting screw and also having a guide slit (22*a*) that can receive the adjusting screw slidably and horizontally; and a jig-B (23) for thrusting the adjusting screw into the pivot nut, said jig-B having a width allowing slidable movement of itself within the guide slit of said jig-A.

6. The process according to claim 5, wherein the fitting device further comprises in one wall of the base (21) a dent capable of receiving the pivot portion (32) of the pivot nut (3).

7. The aiming apparatus according to claim 2, wherein the nut portion (31) of the pivot nut has at an upper part a cavity defined in an axial direction thereof, which can receive the adjusting screw substantially parallel to its axial line, and a slit (31*a*) communicating with the cavity and with the nut portion.

\* \* \* \* \*